No. 865,614. PATENTED SEPT. 10, 1907.
G. SCHUBERT.
SELF FEEDER FOR BALERS.
APPLICATION FILED JUNE 21, 1906.
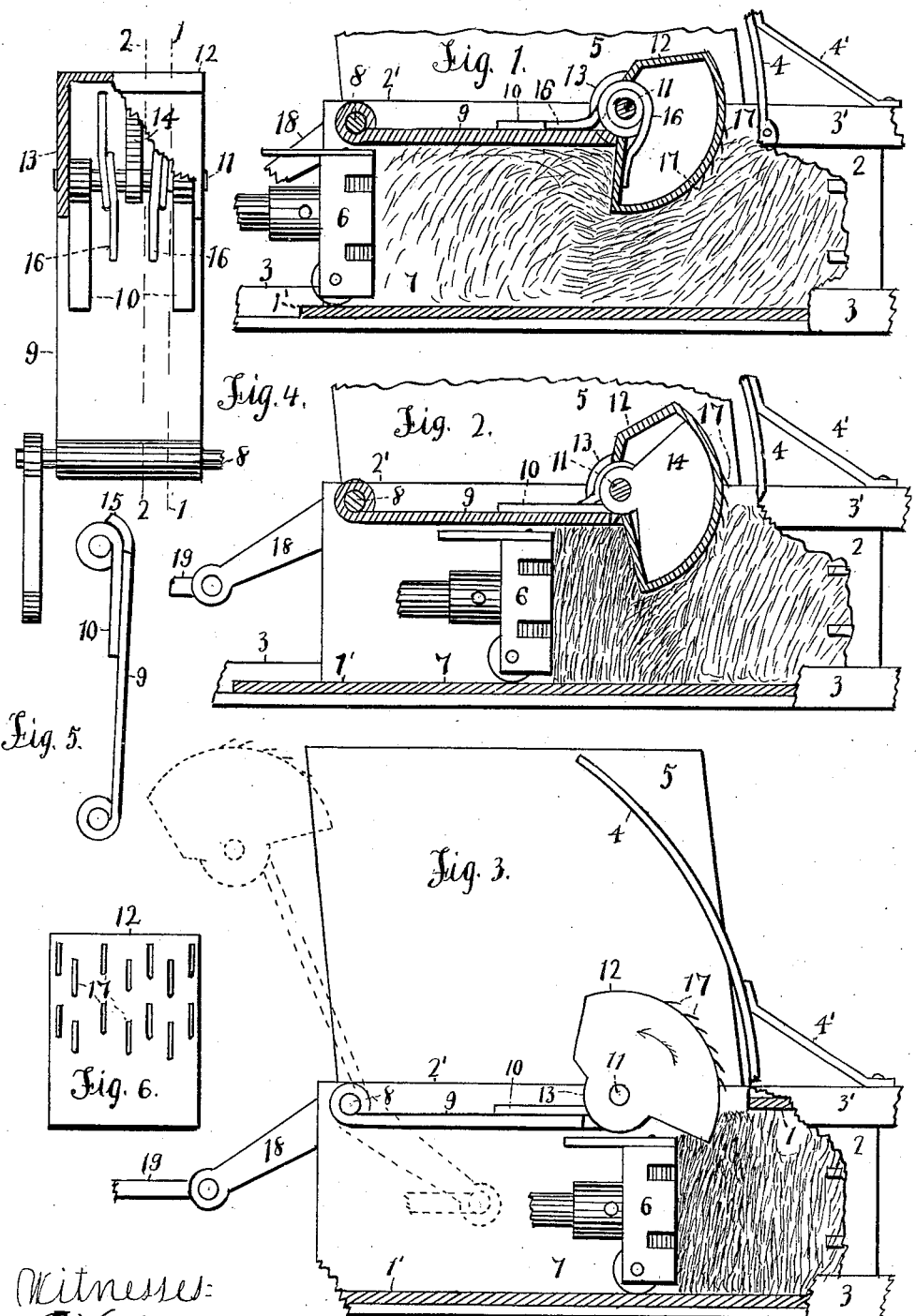

UNITED STATES PATENT OFFICE.

GEORGE SCHUBERT, OF FORT WORTH, TEXAS.

SELF-FEEDER FOR BALERS.

No. 865,614. Specification of Letters Patent. Patented Sept. 10, 1907.

Application filed June 21, 1906. Serial No. 322,665.

*To all whom it may concern:*

Be it known that I, GEORGE SCHUBERT, a citizen of the United States, residing at Fort Worth, in the county of Tarrant and State of Texas, have invented a new and useful Self-Feeder for Balers, of which the following is a specification.

My present invention relates to a self-feeder for hay balers, in which the hay or other fibrous material is placed on or in the hopper, and a plate pivoted on the press to shift such hay in to the compression chamber; and the object of my invention is, to form, and pivot a head on the free end of said pivoted plate, and with the larger portion of the body of said head projecting below the lower level of said plate, or with the head extending well down into the compression chamber, and thus shift a portion of such hay beyond the upper level of the compression chamber; and then yield to the inward moving of the compressed or partly compressed material, or to the inward moving plunger; and to turn out of said compression chamber without materially disturbing the material therein; and to also hold said partly compressed material down to the upper level of the compression chamber for a specified time. This, it will be seen, gives the head, pivoted on the plate, the twofold purpose, of shifting the material below the level of said plate, and also aiding to hold the material down while being compressed. And to provide the outer surface of said head with spurs, to more readily engage the material on its inward movement.

Figure 1 is a vertical longitudinal section view of a compression chamber, provided with my improved feeder; said feeder is also shown in section on line 1—1, of Fig. 4, and in a depressed position; and the plunger is shown at the outer end of its travel, ready to start inward. Fig. 2 is a similar view, with the feeder shown in section on line 2—2, of Fig. 4, and the plunger moved inward to some extent and pressing the partly compressed material against the downward or inward projecting portion of said head, and starting to turn said head out of said compression chamber. Fig. 3 is a similar view as Fig. 2, showing the feeder in full lines, and the head turned nearly out of the compression chamber, and also showing in dotted lines, the feeder elevated or ready to receive a new charge of material. Fig. 4 is a top plan view of the feeder, or the pivoted plate and the head thereon, (which will be designated as the feeder,) a portion of the head being cut away to show the interior construction of same. Fig. 5 is a detail edge view of the pivoted plate. And Fig. 6 is a front view of the head, showing the location of the spurs.

Referring to Fig. 3. 1 and 1′ represents the top and bottom plates, and 2 and 2′ are the side plates of the body of the press, secured in position by corner bars 3, 3, and 3′. The corner bars 3, 3 project to some extent to receive the extension beam, (not shown,). The power end or the extension beam end of the press is considered the front end of the press,) 4 represents the rear end wing of the hopper, secured with its lower end on the corner bars 3′ 3′ and braced in position by a brace 4′ secured with one end on one of the corner bars 3′ and with its opposite end to the wing 4. 5 is a side plate of the hopper secured to the upper edge of the side plate 2, (one side of the hopper only being shown,). 6 is the usual plunger operated in the compression chamber 7. All the above is arranged as in common use and will be readily understood.

8 represents a transverse shaft journaled or pivoted in the front and upper corners of the plates 2 and 2′.

9 represents a plate secured with its front end on the shaft 8, between the plates 2 and 2′, and supporting on its free end in brackets 10 a transverse shaft 11.

12 represents a head, (see Fig. 3,) preferably formed hollow as shown in Figs. 1, 2 and 4, with the sides 13 turned down and perforated, and pivoted on the ends of the shaft 11. 14 is a central rib also pivoted on said shaft 11. The under side of said head is cut out to clear the end of the plate 9, and bracket 10, and the springs 16, 16, later on described. The outer surface of said head is curved to a radius of its pivot, and consists of about one third of a circle; and with the lower end cut or turned under to form an acute angle with the plate 9, see Fig. 1. 17 are spurs on the outer and curved surface of said head projecting downward to readily engage the material. The springs 16, 16 are coiled on the shaft 11, and rest with one end on the plate 9, and with their other end on or in the head 12, in a manner to shift and hold said head 12 in the position seen in Fig. 1. The plate 9 is of a length, to bring the outer surface of the head 12 to an easy working distance of the plate 4, and said plate or wing 4 is curved to a radius of its distance from the shaft 8.

18 is an arm on the projecting end of the shaft 8, and having pivoted on its free end a rod 19, which extends to the power mechanism, not shown.

In operating; As soon as the feeder is raised to the position seen in dotted lines in Fig. 3, hay or other fibrous material is placed on the hopper, and as the plunger moves back or out, the feeder is moved down, by mechanism not shown, to the position seen in Fig. 1, shifting the condensed material from the hopper to the compression chamber, and the inward projecting portion of the head will shift a portion of the material down below the level of the compression chamber; the plunger will now move inward, moving against the fibrous material. The plate 9 prevents said material from rising, and the plunger pressing said material against the downward projecting portion of said head. 12, and turning said head on its pivot or shaft 11 in the direction of arrow in Fig. 3, and gradually turning said head out of the compression chamber, as indicated in Figs. 2 and 3. The lower side of the head being now approximately on line with its supporting plate, and prevents the material from rising while being compressed. By the time the plunger arrives near the end of the head 12, the feeder is allowed to rise, and the operation above described is repeated. The springs 16 16 are of ample tension to move the head 12 to the position seen in Figs, 1 and 2 as soon as released from the compressed material, and hold said head in said position while shifting the material to the compression chamber, and allow said head to yield only to the onward movement of the compressed or partly compressed material, or to the moving plunger.

I do not claim broadly, a plate hinged to the press, to shift the material from the hopper to the compression chamber, nor a projection on said plate to shift the material below the upper level of the upper edge of said compression chamber; but

What I claim is—

1. In a feeder for balers, the combination, with a compression chamber, a hopper on said compression chamber, a plate hinged on said baler arranged to shift the material from the hopper to the compression chamber, a head pivoted on said plate and projecting below the lower level of said plate, for the purpose specified.

2. In a feeder for balers, the combination, with a compression chamber, a hopper on said compression chamber, a plate hinged on said baler arranged to shift the material from said hopper to said compression chamber, a head pivoted on said plate, a spring or springs in contact with said head, and means in said compression chamber to turn said head out of said compression chamber without disturbing the hinged plate.

3. In a feeder for balers, the combination, with a compression chamber, a hopper on said compression chamber, a plate hinged on said baler, a head pivoted on said plate to aid in shifting the material from said hopper to said compression chamber, spurs on said head, a spring in contact with said head, for the purpose specified.

4. In a feeder for balers, the combination, with a compression chamber, a hopper on said compression chamber, a plate hinged on said baler, a head pivoted on said plate to aid in shifting the material to the compression chamber, spurs on the outer surface of said head, springs in contact with said head, and means in the compression chamber to turn said head out of said compression chamber, as specified.

5. A plate, hinged on the baler, a shaft supported by the free end of said plate, a head formed of a quadrant shape and pivoted on said shaft, a spring or springs in contact with said head, for the purpose specified.

GEORGE SCHUBERT.

Witnesses:
C. H. HOLLEY,
L. B. AVERITT.